A. B. CASE.
CUTTER FOR LAWN MOWERS.
APPLICATION FILED SEPT. 22, 1908.
924,318.
Patented June 8, 1909.
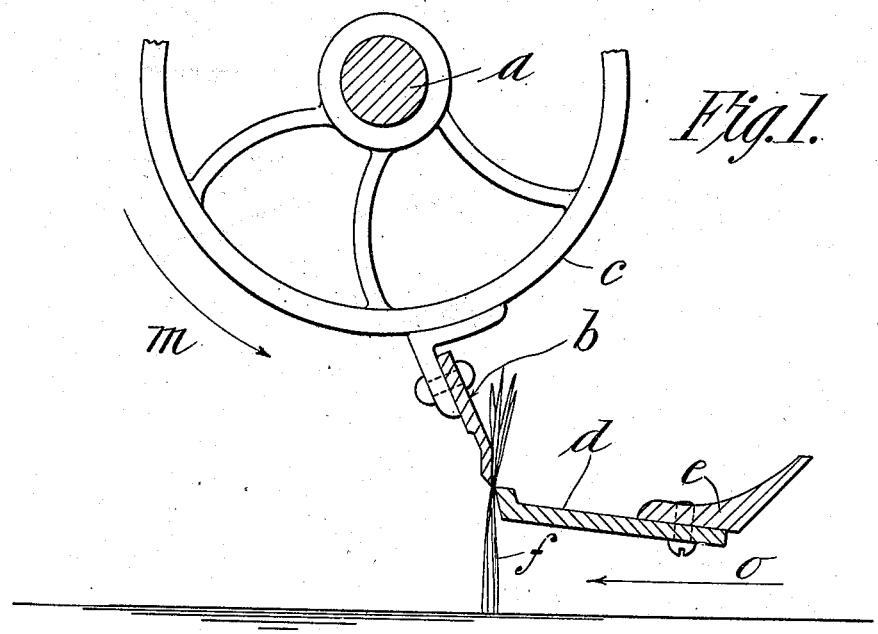
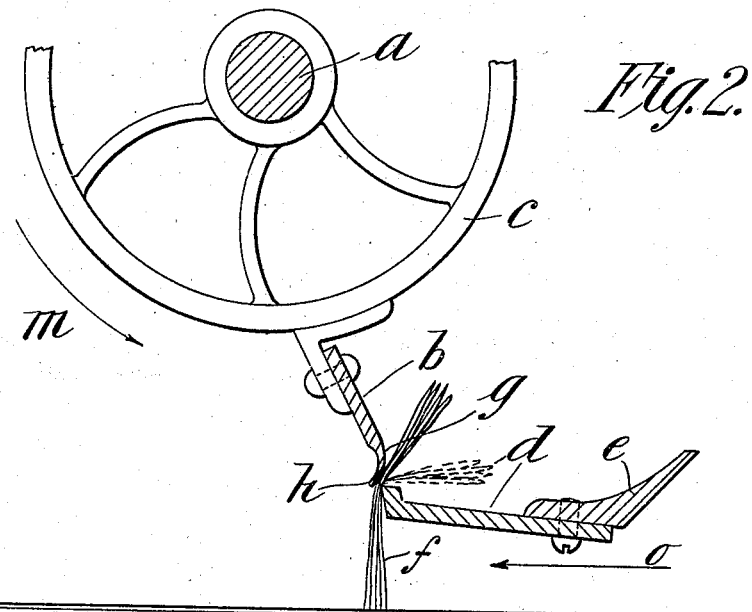
WITNESSES:
INVENTOR.
ATTORNEY.

UNITED STATES PATENT OFFICE.

ADELBERT B. CASE, OF SPRINGFIELD, MASSACHUSETTS.

CUTTER FOR LAWN-MOWERS.

No. 924,318.      Specification of Letters Patent.      Patented June 8, 1909.

Application filed September 22, 1908. Serial No. 454,148.

*To all whom it may concern:*

Be it known that I, ADELBERT B. CASE, a citizen of the United States of America, residing at Springfield, in the county of Hampden and State of Massachusetts, have invented new and useful Improvements in Cutters for Lawn-Mowers, of which the following is a specification.

This invention relates to lawn mowers and is in the nature of an improvement on the construction described and claimed in my Letters Patent for improvement in "rotary cutters for lawn mowers" issued December 18, 1906 under No. 838,521. In said patent the cutting blade is described and claimed as consisting of a blade whose cutting edge is "bent back relatively to the direction of rotation thereof so as to form a surface that stands at an angle to the body portion of the blade, said bent surface being substantially at a right angle to the fixed blade of the mower". The particular form of blade described and claimed in my said prior patent, and its relation to the fixed blade, possesses certain pronounced advantages over the construction generally in use at the time said patent was issued, which generally accepted type is illustrated in Figure 4 of my said patent. A comparison of the construction claimed in said patent (together with that which forms the subject matter of the present application) with the generally accepted construction of the cutting elements as typified in Fig. 4 of said patent will show that the subject matter of this application is in the nature of a further advance along the same path as indicated in said patent, viz.,—in the perfection of a construction whereby a drawing cut of the rotating blade across the edge of the stationary blade may be attained as compared with the pushing cut which is a feature characteristic of lawn mower constructions prior to the invention covered in my said patent, it being obvious that the pushing cut must result from any blade arrangement in which the angle of the adjacent rotating and fixed blade surfaces is greater than a right angle at the point of their operative contact.

Referring to the present invention, the drawings forming part of this application have been made with a view of clearly disclosing the step in advance of the patented construction above referred to, Fig. 1 being a sectional elevation of the stationary blade and part of the rotating blade of a lawn mower embodying the construction forming the subject matter of my prior patent herein referred to. Fig. 2 being a like view of similar parts constructed according to and embodying in its preferred form the subject matter of the present invention.

Referring to these drawings: In each of the figures thereof, $a$ indicates the shaft carrying the rotary blades of a lawn mower only one of which, $b$, is shown, this being mounted in the usual manner in any desirable way on the shaft, as for example, by means of the spiders $c$ to which the blades are riveted.

The stationary blade is indicated by $d$, this being riveted in the usual manner to a web or bar $e$ extending transversely between the two side frames of the machine.

It will be noted, by referring to Fig. 1, that the grass to be cut (indicated herein by $f$) is in a substantially perpendicular position at the moment of cutting, whereas, by referring to Fig. 2, it will be observed that the form of the rotating blade $b$, near the cutting edge thereof, is such that the shoulder $g$ is formed thereon on the forward side of the blade in proximity to the cutting edge thereof, this shoulder extending from one end of the blade to the other, which shoulder is forward of, or projects beyond the cutting edge $h$ of the blade. The object of so forming the blade is to bend the free ends of the grass backward over the edge of the fixed blade prior to the engagement of the cutting edges of the rotary and the fixed blades. The effect of this is threefold,—first, it makes a break in the stalk of the grass over the sharp edge of the stationary blade which, as is well known, makes it possible to more easily sever the same; second, by so bending backward the ends of the tufts of grass over the edge of the stationary blade prior to the severing thereof, said tufts serve to hold the machine to the ground whereby the jumping of the same on relatively uneven ground is prevented to a very great degree; and, third, it provides a cutting edge for the revolving blade so located relative to the body of the blade that it is drawn across the edge of the stationary blade instead of being pushed across said edge: and the fact that the free ends of the grass are bent backwardly and downwardly over the cutting edge of the stationary blade by the movement of the shoulder $g$ over the edge of the stationary blade in advance of the engagement of the cutting edges of the blades and the cutting edge of the rotary blade is then drawn over the edge of said stationary blade, greatly reduces the power necessary to rotate the shaft $a$ to effect the cutting of the grass. Furthermore, the holding of the machine to the ground in the manner described produces a much more even surface of cut lawn than is possible when the machine is free to jump more or less when operated on a lawn having an uneven or rough surface.

A further material advantage inherent in the construction described herein is the fact that the cutting edge of the blade $b$ need not be sharp to do good work though the edge of the stationary blade $d$ should be. Furthermore, by reason of the peculiar cross sectional form of the blade $b$ if any hard substance be interposed between the movable and stationary blades in operating the machine the cutting edge of the blade $b$ will not come in contact therewith but such object will be struck by the shoulder $g$ on said blade and jammed against the edge of the stationary blade and very little damage to the machine would result for the reason that the stationary blade in lawn mower constructions is made very hard.

The blade $b$ may be made in any manner which will result in the provision of a rib or shoulder having the function of the shoulder $g$ described herein, that is to say the specific cross sectional form illustrated and described in this application might be varied with greater or less extent but any form of blade whereby the grass may be bent backward over the edge of the stationary blade prior to being cut, is deemed to be the equivalent of the form of blade shown herein and to embody the essential elements of this invention.

In the drawings, the arrow $m$ indicates the direction of rotation of the rotating blade $b$, and the arrow $o$ the direction of movement of the machine in cutting the grass, and where the word "forward" has been used in the specification to designate one side of the blade $b$ that side is meant which is first presented to the stationary blade.

What I claim, is:—

1. A lawn-mower comprising a stationary blade and a movable blade, said movable blade having a shoulder thereon near its cutting edge whereby the grass may be bent over the edge of the stationary blade in advance of the meeting of the cutting edges of the two blades.

2. In a machine for cutting grass, two blades,—one being movable relative to the other,—one of said blades having means to bend the grass down over the edge of the other blade prior to the severing of the grass.

3. A lawn mower comprising a rotating blade and a stationary blade, said rotating blade having a shoulder extending from end to end thereof parallel with, and near, its cutting edge, and so positioned as to pass over the edge of the stationary blade in advance of the cutting edge of the rotating blade to bend the grass backward over the stationary blade prior to cutting it.

4. A lawn mower having a movable blade and a stationary blade, said movable blade having its cutting edge so positioned that at the meeting of the cutting edges of said two blades an acute angle will be formed between the immediately contiguous surfaces of said two blades at the front of the movable blade, whereby a drawing cut of the edge of the movable blade over the edge of the stationary blade may be effected.

ADELBERT B. CASE.

Witnesses:
 WM. H. CHAPIN,
 K. I. CLEMONS.